(No Model.) 6 Sheets—Sheet 1.
T. L. WALLACE & R. COYLE.
SAW FILING MACHINE
No. 565,948. Patented Aug. 18, 1896.
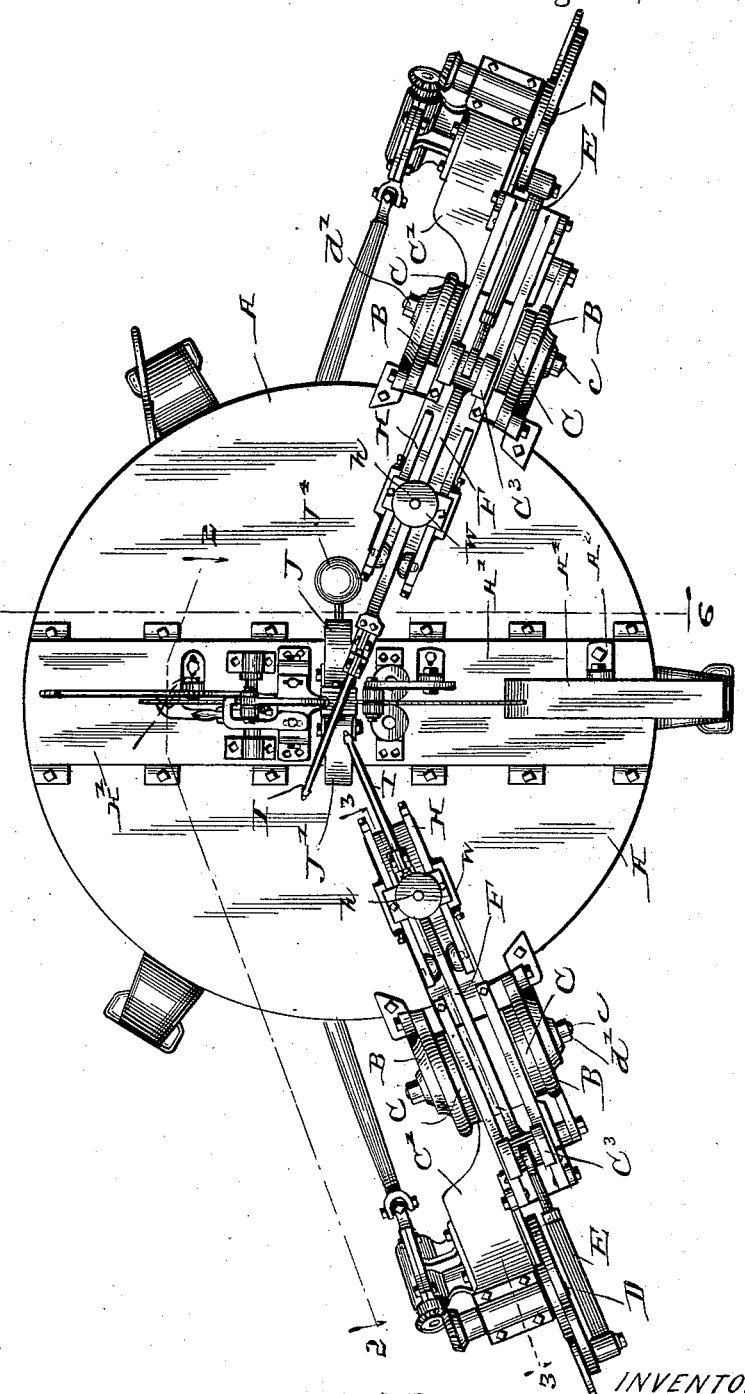
Fig. 1.— Scale ⅒ Full size.
WITNESSES:
INVENTORS,
Thomas L. Wallace
and Robert Coyle,
Chester Bradford
ATTORNEY.

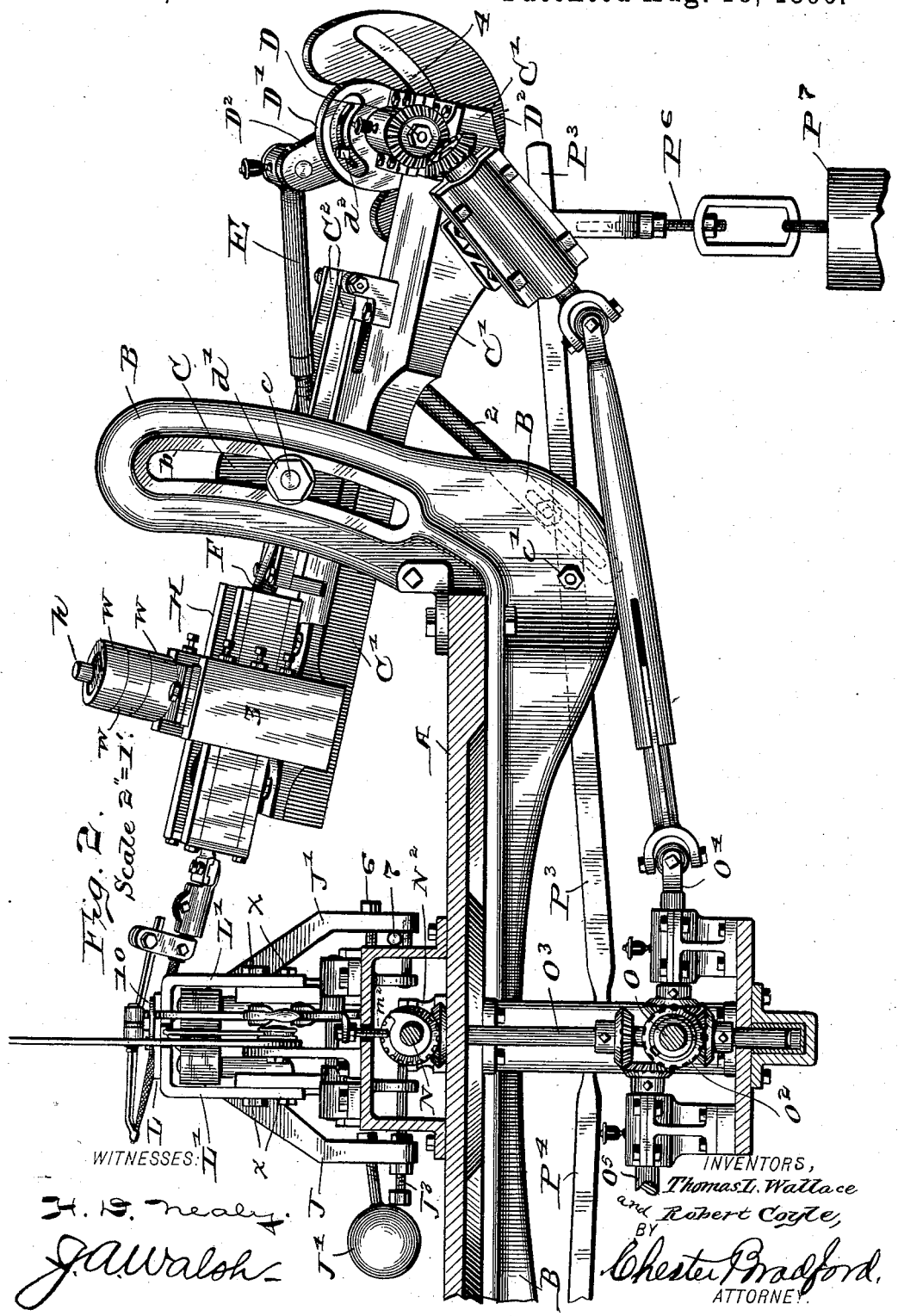

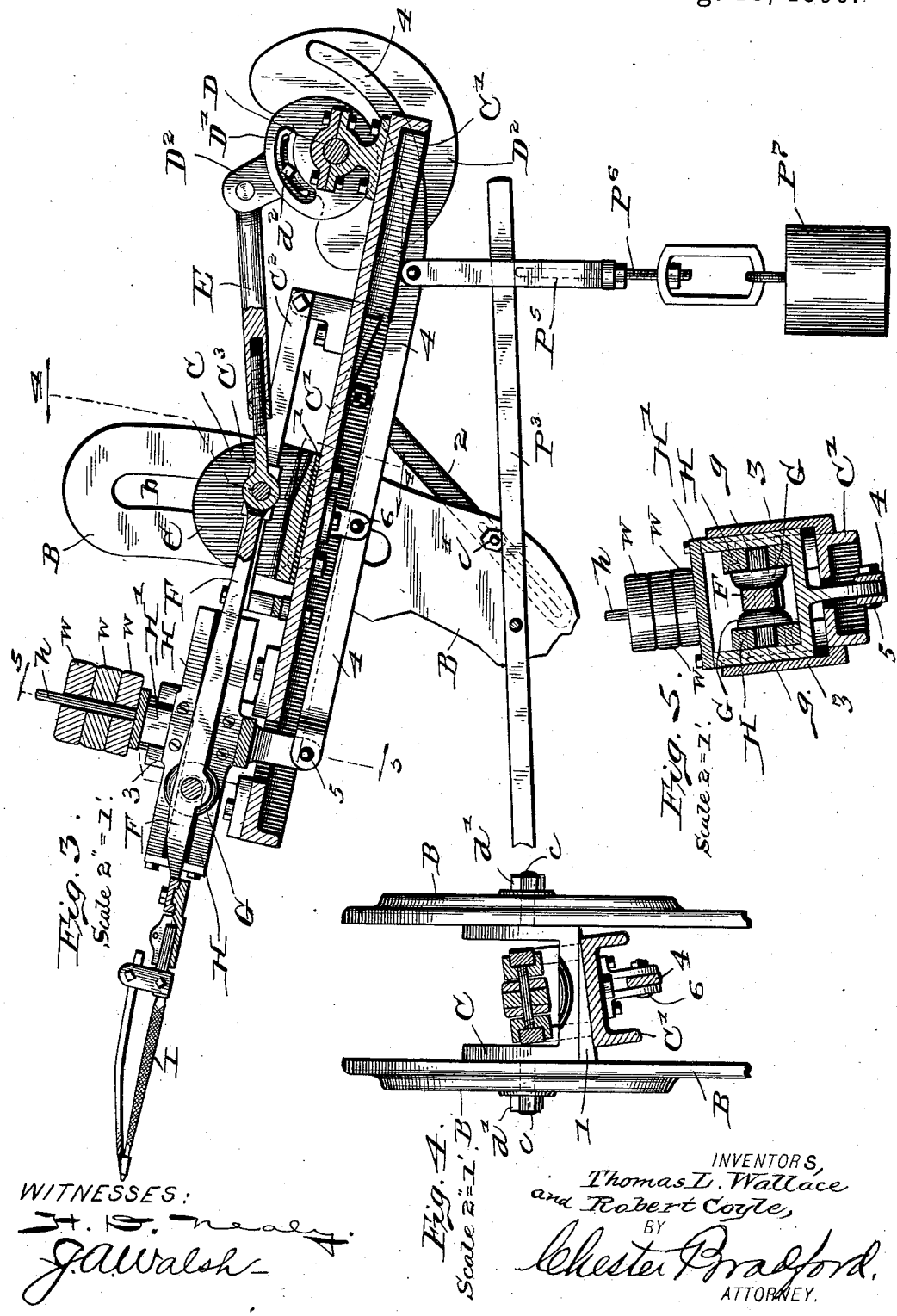

(No Model.) 6 Sheets—Sheet 4.
T. L. WALLACE & R. COYLE.
SAW FILING MACHINE.
No. 565,948. Patented Aug. 18, 1896.
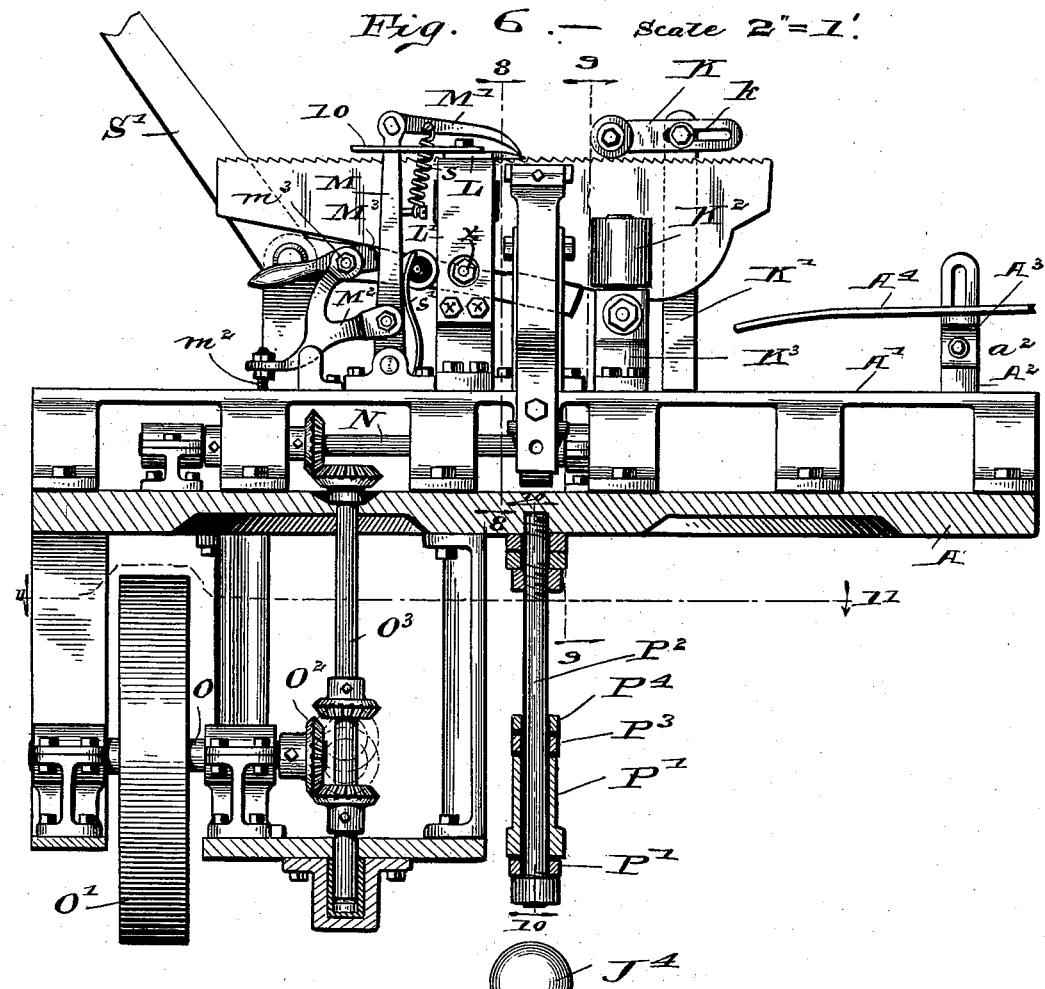
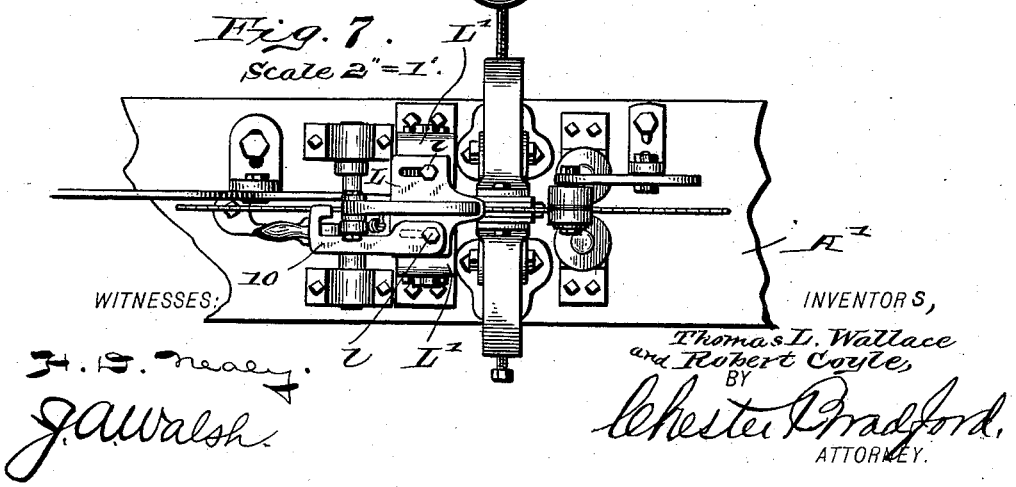
WITNESSES:
INVENTORS,
Thomas L. Wallace
and Robert Coyle,
BY
Chester Bradford,
ATTORNEY.

(No Model.) 6 Sheets—Sheet 5.
T. L. WALLACE & R. COYLE.
SAW FILING MACHINE.
No. 565,948. Patented Aug. 18, 1896.
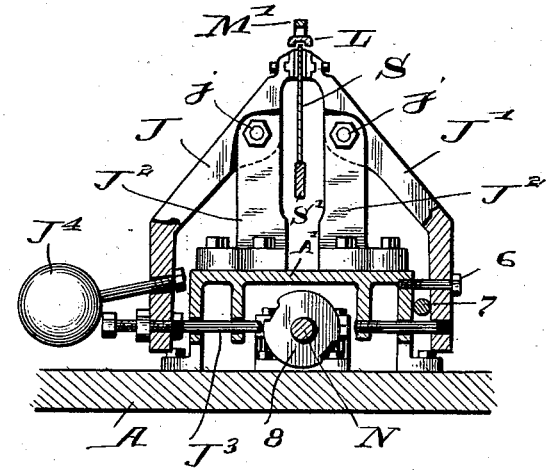
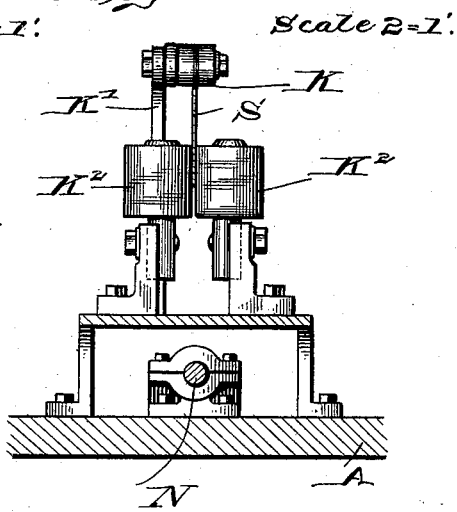
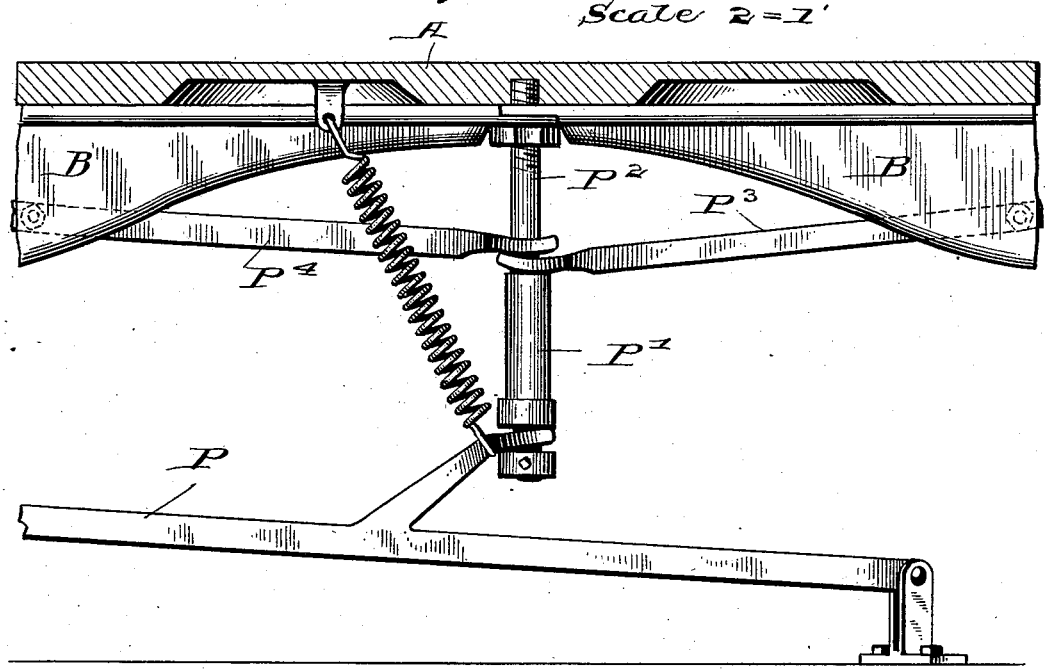
WITNESSES:
INVENTORS,
Thomas L. Wallace
and Robert Coyle,
BY
Chester Bradford,
ATTORNEY.

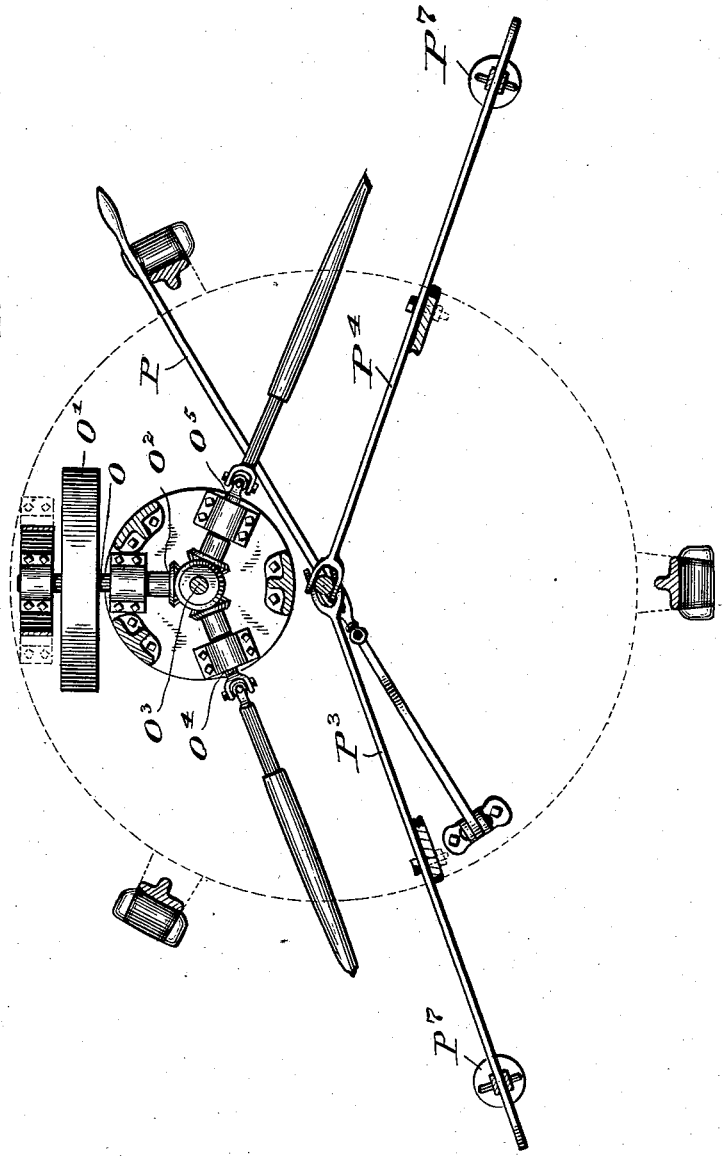

UNITED STATES PATENT OFFICE.

THOMAS L. WALLACE AND ROBERT COYLE, OF INDIANAPOLIS, INDIANA, ASSIGNORS TO THE E. C. ATKINS & COMPANY, OF SAME PLACE.

SAW-FILING MACHINE.

SPECIFICATION forming part of Letters Patent No. 565,948, dated August 18, 1896.

Application filed March 10, 1896. Serial No. 582,633. (No model.)

*To all whom it may concern:*

Be it known that we, THOMAS L. WALLACE and ROBERT COYLE, citizens of the United States, residing at Indianapolis, in the county of Marion and State of Indiana, have invented certain new and useful Improvements in Saw-Filing Machines, of which the following is a specification.

The object of our said invention is to improve and render more efficient that class of filing-machines shown and described in application Serial No. 503,346, filed March 12, 1894, wherein one of us, the said Thomas L. Wallace, appears as an inventor jointly with one James A. Reed; and also to simplify and render less expensive the construction thereof. In carrying out this object we have made numerous merely mechanical changes, and have adopted features not of our own invention. What we regard as the essential features of the present invention, however, will be first fully described in connection with the following general description of the machine, and will then be specifically pointed out in the claims.

Referring to the accompanying drawings, which are made a part hereof and on which similar letters of reference indicate similar parts, Figure 1 is a top or plan view of a machine embodying our said improvements and invention; Fig. 2, a sectional view as seen from the dotted line 2 2 in Fig. 1, showing a considerable portion of the mechanism in side elevation; Fig. 3, a similar view on the dotted line 3 3 in Fig. 1, showing certain of the same mechanism in central vertical section. Figs. 4 and 5 are transverse sectional views on the dotted lines 4 4 and 5 5, respectively, in Fig. 3; Fig. 6, a detail sectional view showing how the saw is held in position and fed forward, as seen from the dotted line 6 6 in Fig. 1; Fig. 7, a detail top or plan view of most of the parts shown in Fig. 6; Figs. 8 and 9, transverse sectional views on the dotted lines 8 8 and 9 9, respectively, in Fig. 6; Fig. 10, a detail view showing certain lever attachments, and Fig. 11 a horizontal or plan view taken beneath the table and illustrating said lever attachments on a smaller scale. The scale of said figures of drawings is indicated in connection with each of said figures, respectively, and the direction of sight in the sectional views from the dotted lines is indicated by arrows.

Much of the mechanism in this machine is duplicated; but we have described the machine throughout in the singular number, and it will be understood, of course, that such description applies equally to corresponding parts where such parts exist.

In said drawings the portions marked A represent the table or stationary frame; B, adjustable standards or frames carrying the filing mechanism; C, a vertically-adjustable carrying-block mounted on said standards; D, the crank-shaft; E, the pitman; F, the file-carriage; G, a cross-head; H, adjustable ways therefor; I, the files; J J', the saw-holding jaws; K L, saw-guides; M, the main arm or lever of the saw-feeding mechanism; N, a shaft for operating the saw-clamping jaws and the saw-feeding mechanism; O, the main driving-shaft, and P the lever for throwing the filing mechanism into and out of operative position.

The main table A is circular in form, and the frames or standards B are secured thereto at its edge and adjustable around the same. While we believe this feature to be novel, it is not of our invention. This table has various hangers and bearings secured thereto, and also, preferably upon the central portion, a raised platform or supplemental table A' upon which are various standards and bearings. Upon this platform is also the standard $A^2$, which is preferably slotted and carries adjustably thereon a bracket $A^3$, which is secured thereto by a bolt $a^2$, and which in turn carries a receiving platform or table $A^4$ upon which the saws will come as they are delivered from the machine after the filing operation. Obviously this platform or table may be adjusted vertically as may be desired, and thus accommodated to various widths of saws.

The frame or standards B are slotted, as shown, said slots $b$ being bounded by curved lines struck from the point where the files operatively engage with the saw, as most clearly indicated in Fig. 2, so that uniform distance from said point may be maintained whatever the elevation of the file-operating mechanism. As before stated, these standards are adjusted circumferentially of the table A, and thus the files may be thrown to any angle desired. Said standards are arranged in pairs, as most plainly indicated in Fig. 4, and carry between them the carrying-block C, which may be adjusted in said slots $b$ and held to any adjusted position desired by means of the bolts $c$, extending out therefrom, and the nuts $d'$ thereon. The vertical position of the file-operating mechanism is thus determined.

The carrying-block C is secured between a pair of standards B, as just stated. A bed-plate C' is firmly secured to the under side of said block by means of bolts, as shown, but usually at an angle therewith, the inclination being determined by means of some suitable device, such as a wedge 1. These wedges may, of course, be of any inclination desired, and a number of them may be provided, which may be interchangeable with each other, so that the angle can be changed whenever required by simply loosening the connection, removing the wedge therein, and substituting another of the required dimensions, and other suitable devices, such as set-bolts, may be substituted therefor.

As will be observed by reference to the drawings, the bed-plates are inclined in relation to the table, the file-carrying end being the highest, and also, as has just been described, they are inclined transversely. This double inclination (or inclination in two directions) is important to the satisfactory operation of this machine, as it brings the file into that relation with the teeth of the saw by which the best results are secured. The files cut more rapidly and wear out less rapidly than if the bed-plate carrying them were level, as we have determined by careful study and experiment. In order to stiffen the support of this bed-plate C', we provide a brace 2 therefor, which is secured to said bed-plate at one end and to the frame B at the other.

In order to permit of the adjustment required, one end of the brace is slotted, as indicated by the dotted lines in Figs. 2 and 3, and a securing-bolt $c'$ passes through the slot in said brace and a perforation in the standard B. Secured also to said bed-plate C' is a rigid guide-yoke 3, in which is mounted a slide-box H', carrying the vertically-adjustable ways H for the cross-head. The slide-box H' is mounted on a lever 4, to which it is connected by a pivot 5, said lever in turn being mounted on a pivot 6, preferably directly below the carrying-block C. Its other end extends outwardly and is preferably curved, and is operated by a cam D' on the shaft D. When said shaft revolves, the cam comes in contact with this lever 4 at the proper point, and through it raises the slide-box H' and adjustable ways H, thus raising the cross-head, file-carriage, and the file carried thereby out of contact with the saw being filed at the end of the forward stroke, and so holds it during the reverse motion of the file.

The crank-shaft D is mounted in bearings on the outer end of the bed-plate C', is driven by a series of shafts having universal couplings and suitable gears, much in the manner shown and described in the Wallace and Reed application above referred to, although the parts are somewhat differently arranged, and itself, through its crank-arm and the pitman E, drives the file-carriage and cross-head. The crank-arm $D^2$ embodies or is provided with a counterweight, and this is an improvement upon the machine heretofore referred to, as it causes the file to operate more steadily. Located upon this same shaft is the cam D', which engages with the lever 4 and operates to raise the file out of engagement with the work during its return movement, as has already been explained. This cam, as plainly shown in Figs. 2 and 3, is provided with a curved slot, and is secured on the crank-arm by means of the bolt $d^2$. By operating said bolt said cam may be adjusted as desired, and the point at which the file shall be raised from the work thus accurately determined. One side of said cam is too small to come in contact with said lever, and therefore the file is not interfered with during its forward or operative movement, but is raised out of engagement immediately upon reaching the end of its stroke, and so held until the return movement is completed, when the cam passes out of contact with the lever and the file again drops into operative position.

The pitman E is an ordinary two-part pitman, the parts being adjustable in relation to each other, as shown, and is connected to and drives the file-carriage F.

The file-carriage F is mounted on the cross-head G near its front end and upon the bars $C^2$ on the bed-plate C' (at or near the point where the pitman is connected thereto) by means of an ordinary cross-head $C^3$.

The cross-head G carries the forward end of the file-carriage F and has gudgeons $g$, which enter the ways H and are guided thereby. These gudgeons, or equivalent rocking bearings, are necessary to this cross-head, although a reciprocating part, because of the shifting position of said part as the file advances and recedes.

The adjustable ways H are carried by the slide-box H', mounted in the guide-yoke 3, and may be easily raised and lowered in the operations which have just been described. They are of sufficient strength so that the slides therein will hold the gudgeons of the cross-head G throughout the movement of the file-carriage.

The files I are mounted in the file-carriages, as shown.

So far as there is any novelty in the construction or arrangement of the file-holding attachment, we elect to claim the same in another but concurrent application.

The saw-holding jaws J and J' may be both movable jaws, if desired, and are both shown as mounted on pivots $j$ on the standards $J^2$. In practice, however, it is only necessary that one of said jaws should be movable, and we have therefore shown the jaw J' fixed in position by means of a bolt 6 and wedge 7. The other jaw J moves on its pivot $j$, and is thrown into operative contact with the saw S being operated upon by means of the cam-wheel 8 on the shaft N.

The guide K consists of a roller composed of some material not calculated to dull or injure the sharpened teeth, carried by an adjustable arm, which latter is mounted upon a standard K', the same being slotted and secured to said standard by a bolt $k$, as shown most plainly in Fig. 6. This guide, in connection with the guide L, insures that the edge of the saw shall travel uniformly in the same plane throughout the period the saw remains in the machine. The travel and position is guided additionally by means of the vertical rollers $K^2$, mounted on standards $K^3$, said rollers $K^2$ being just below the roller of the guide K.

The guide L being above the saw at a point before the files come in contact therewith, may be of metal. The saw is held against the guides K and L continuously during the filing operation, and is thus maintained in uniform relation to the files at the point of contact. The guide L is adjustable horizontally, as indicated in Fig. 7, where it is shown as secured to the upper portion of the standards L' by means of set-screws $l$, passing through slots therein. One of said set-screws also holds in place a stay 10 by which the movement of the feed-arm M is limited. The horizontal adjustability of this guide L enables it to serve as a means whereby the engagement of the pawl M' with the saw-tooth may be regulated, as will be presently more fully explained. As shown, the standards L' are made in two parts secured together by means of bolts $x$, which is of advantage in assembling or disassembling or adjusting the parts of the machine at and near this point.

The feed-works of this machine consist principally of the vibrating lever M, carrying the pawl M', which engages with the teeth of the saw, and is held into engagement with said teeth by the spring $s$, and which lever has also an arm $M^2$, provided with an adjustable point $m^2$, which extends down into the path of a cam-wheel N' on the shaft N, and is operated upon thereby, as will be understood by reference to Figs. 6 and 2 of the drawings. In order that the feeding operation may be interrupted without discontinuing the motion of the machine, we have pivoted the arm $M^2$ to the lever M, and have provided a shiftable brace-point $M^3$, which is pivoted thereto by means of the pivot $m^3$, and one end of which is formed into a handle, so that it can be shifted from one position to the other. This brace-point being in the form of a cam, when in the position shown in Fig. 6 holds the parts into operative position, so that the pawl M' will engage with the saw-teeth and thus feed the saw forward, as is designed. When, however, this brace-point is thrown down by raising the handle thereof into a substantially vertical position, the relation of the parts is changed, and, while they still continue in motion, the point of the pawl has been withdrawn back up onto the top of the guide L, so that it does not engage with the saw-teeth, and said saw consequently ceases to move forward. This is frequently desirable during the operation of such a machine, as files frequently need slight attention, which necessitates a stoppage of the filing operation, while it is inexpedient, if it can be avoided, to take time to shut down the entire machine. In such cases the shifting of this brace-point by means of its handle readily accomplishes all that is desired. The lever is held into contact with the brace-point, so that the parts operate together, substantially as if they were rigid, by means of a stiff spring $s'$, secured to the platform A' at its lower end and resting against the opposite side of said lever from said brace-point at or near its upper end. As before stated, the contact-point $m^2$ is adjustable, being preferably in the form of a threaded bolt having a pair of adjusting-nuts, which engage with a suitably-formed extension on the arm $M^2$. By this means the exact point to which the pawl M' shall reach in operation is determined with great nicety.

The shaft N is arranged horizontally, preferably below the platform A' and above the main table A, and carries the saw gripping, guiding, and feeding mechanism. Said shaft is provided with the cams M' and 8, which respectively operate the saw-feeding and saw-gripping mechanism, as has already been explained. The position and operation of said cam M' will be understood upon reference to Figs. 2 and 6, and the operation of the cam-wheel 8 will be best understood by reference to Fig. 8, where it is shown as operating upon the rod $J^3$ to force the jaw J toward its fellow, clamping the saw S between them. The weight $J^4$ operates reversely to the thrust of this cam and opens said jaw when the recessed portion of said cam comes opposite the point of the rod $J^3$.

The main shaft O is driven by a belt (not shown) running from some suitable source or power to the pulley O' thereon. It has a bevel gear-wheel $O^2$ on its end, which engages at various points on its circumference with other bevel gear-wheels, and through them driving shafts $O^3$, $O^4$, and $O^5$, which latter extend out and drive various parts of the mechanism, as clearly indicated in the drawings. While we believe this particular system of gearing to be novel, it is not of our invention and will not therefore be further described or claimed herein.

The lever P, as shown most plainly in Fig. 10, engages with a sleeve P' on the rod $P^2$, extending down from the frame A, and which sleeve carries on its upper end the inner ends of levers $P^3$ and $P^4$, which said levers extend out and engage with the devices for throwing the file out of engagement, as shown most plainly in Fig. 3, where the end of the lever P³ is shown as passing through a stirrup P⁵, suspended from the lever 4. This stirrup carries an adjustable rod P⁶, which serves as a bearing for the lever P³, so that the relation of the parts can be adjusted as desired. The weight P⁷ is also suspended from the stirrup P⁵ to counterbalance and steady the mechanism with which it is connected, and is heavy enough to substantially exactly counterbalance the devices carried upon the other end of the lever 4 when the weights $w$ are removed. When in this condition, and without these weights $w$, the file will touch very lightly upon the saw. This is the proper condition of this mechanism when the files are new and sharp; but as they become worn it is desirable to increase the pressure of the files on the work, and for the purpose the weights $w$ are provided, which, as shown most plainly in Figs. 2 and 3, are placed upon the stem $h$. There are several of these weights, and they are added (singly or otherwise) from time to time, as the file becomes more and more worn, each weight adding a little more to the pressure of the file on its work.

The saw S is shown as an ordinary hand-saw, and is gripped and held between the jaws J and J′ and the guides and guide-rollers K, L, and K². It is held up against the guides K and L by means of a lever S′, which extends out a suitable distance and bears a suitable weight. This feature, however, is more clearly shown, described, and claimed in a concurrent application, and is therefore not further described herein.

The operation of this machine may be recapitulated as follows: A saw is placed in position under the guides and between the jaws, as has been explained, and is there held by the appliances described. It is fed forward by the feed-works consisting of the parts M, M′, M², and N′, said feed-works being adjusted to move the saw a distance equal to the spacing of the teeth. The files, driven by the mechanism described, in their forward movement alternately strike the notches in the saw-plate between the teeth and file said teeth uniformly. Said files are raised out of contact on the return movement by means of the cams D′, operating through the levers 4 and the other devices, as described. Each and all of the parts are adjustable to the size and character of the saws being operated upon, and the result is that the saws are filed with great accuracy and expedition.

Having thus fully described our said invention, what we claim as new, and desire to secure by Letters Patent, is—

1. The combination, in the file carrying and operating mechanism of a saw-filing machine, of a carrying-block secured to frame-standards, a bed-plate secured to said carrying-block and held at a transverse inclination thereto, an adjusting device whereby said inclination is secured, and the file-operating mechanism mounted on said bed-plate, whereby said mechanism may be secured at any desired angle, substantially as set forth.

2. The combination, in a saw-filing machine, of a table, a saw-holding mechanism centrally mounted on said table, a saw-filing mechanism also mounted on said table and embodying a bed-plate upon which the operative parts are immediately mounted, said bed-plate being inclined in respect to the table both longitudinally and transversely, substantially as shown and described.

3. The combination, in a filing-machine, of a table, a saw-holding mechanism, a file carrying and operating mechanism, a bed-plate for said last-named mechanism, standards between which said bed-plate is carried, a carrying-block secured to said standards, and a wedge interposed between said carrying-block and said bed-plate, substantially as and for the purpose set forth.

4. The combination, in a filing-machine, of the framework provided with two-part standards having curved slots struck from the point of operation of the file, and carrying-blocks between the parts of said standards carrying the file-operating mechanism and provided with gudgeons entering and adjustably secured in said slots, whereby the vertical position of said file-operating mechanism can be adjusted and its relation to the filing-point still maintained, substantially as shown and described.

5. The combination, in a saw-filing machine, of the framework having standards, the carrying-block mounted in said standards, the bed-plate adjustably secured on said carrying-blocks, a crank-shaft mounted in bearings rigidly secured to said bed-plate, a pitman driven by said crank-shaft, a cross-head running on ways fixedly secured to said bed-plate, a guide-yoke also fixedly mounted on said bed-plate, adjustable ways for the file-carriage mounted on slides in said guide-yoke, and a file-carriage driven by said pitman mounted in said adjustable ways.

6. In a saw-filing machine, the combination of the file-carriage, ways in which said file-carriage operates, a lever pivoted intermediate its length to the bed-plate, and at its front end hinged to said ways, which are carried thereby, its other end extending back alongside the crank-shaft, and a cam-wheel on said crank-shaft adapted to come in contact with and operate said lever, whereby the file is raised out of engagement with the saw during its return movement but permitted to drop into operative position during its forward movement, substantially as set forth.

7. The combination, in a filing-machine, of a bed-plate for the file-carrying mechanism, a guide-yoke thereon for the file-carriage ways, said file-carriage ways, a file-carriage carried thereby, and a lever pivoted to said bed-plate and to said file-carriage ways and extending back into the path of a revolving cam, and said revolving cam, substantially as and for the purpose set forth.

8. The combination, in a filing-machine, of a bed-plate for the file-carrying mechanism, a lever mounted on said bed-plate, the filing mechanism carried by one end of said lever, a counterbalancing-weight secured to the other end of said lever, and a series of small removable weights adapted to be placed upon the file-carrying mechanism, whereby the force of contact of the file with its work may be increased as the file wears away, substantially as shown and described.

9. The combination, in a filing-machine having two filing mechanisms, with the devices supporting the file-carriages, of levers secured thereto, hangers on said levers, second levers extending therefrom to beneath the machine and coming together at a common point adjacent to a downwardly-extending rod, a sleeve on said rod, and a third lever for operating said sleeve together with said levers, and thus simultaneously raising the several files out of operative position, all substantially as shown and described.

10. The combination, in a filing-machine having two filing mechanisms, of bed-plates supporting the filing mechanisms, levers pivoted to said bed-plates and immediately supporting the file-carriages, hangers on the opposite ends of said levers, other levers extending therefrom to beneath the machine and coming together at a common point, a vertical guide-rod whereby the inner ends of said levers are guided, and a third or operating lever extending also to said guide-rod and serving to operate the other levers, all substantially as shown and described and for the purpose as specified.

11. The combination, in a filing-machine, of the file-gripping jaws J and J', a cam-carrying shaft below said jaws, a rod or rods secured to the lower ends of one or both of said jaws and extending into the path of said cam, whereby said jaws are forced together, and a weight or weights whereby said jaws are operated reversely to said cam and thus opened, substantially as shown and described.

In witness whereof we have hereunto set our hands and seals, at Indianapolis, Indiana, this 5th day of March, A. D. 1896.

THOMAS L. WALLACE. [L. S.]
ROBERT COYLE. [L. S.]

Witnesses:
CHESTER BRADFORD,
JAMES A. WALSH.